Dec. 3, 1929.　　　W. P. VANACE　　　1,737,626
OYSTER AND CLAM OPENER
Filed Aug. 8, 1928　　　2 Sheets-Sheet 1
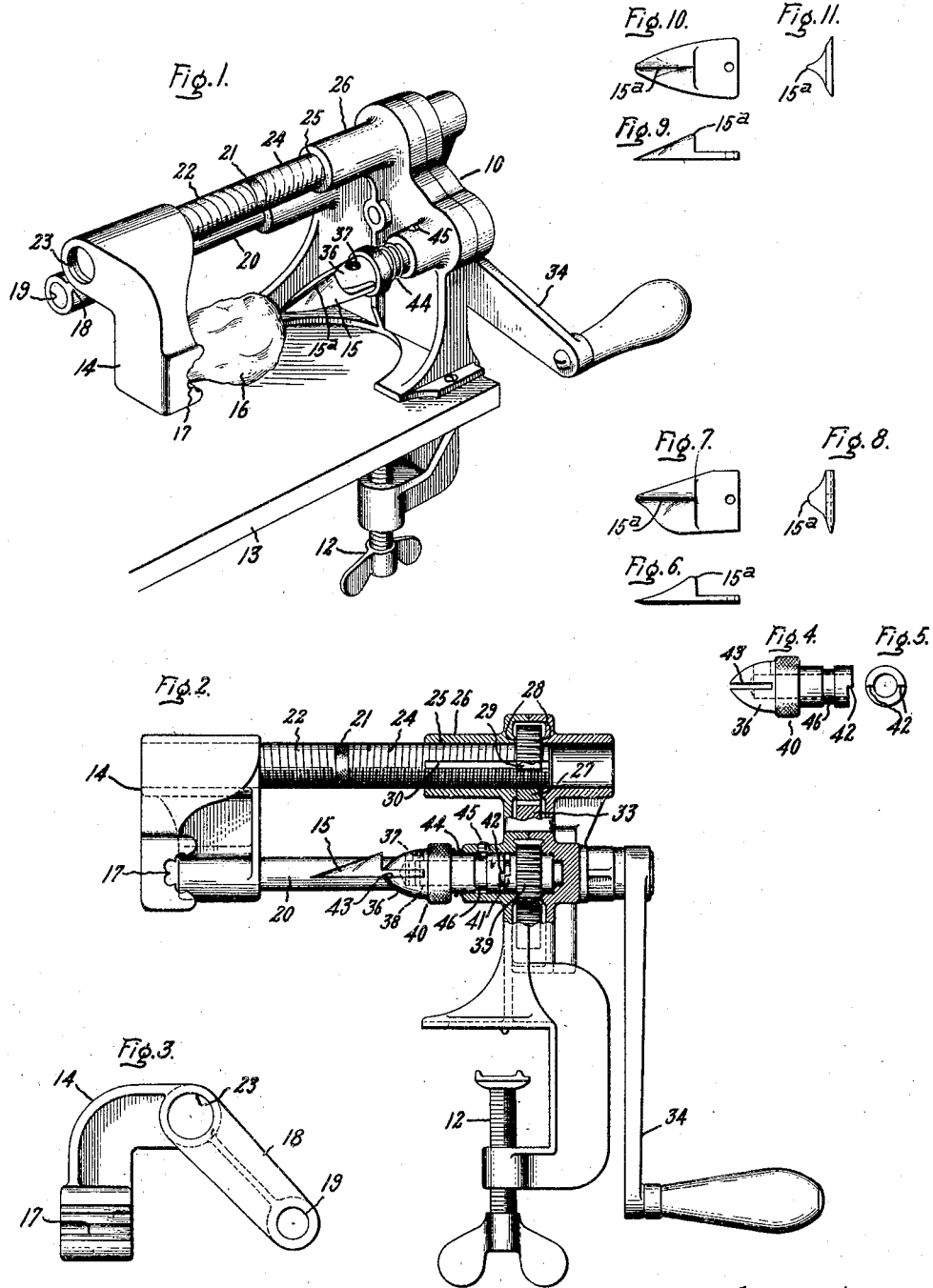
Inventor:
William P. Vanace,
by Raymond A. Miles
His Attorney.

Dec. 3, 1929.   W. P. VANACE   1,737,626
OYSTER AND CLAM OPENER
Filed Aug. 8, 1928   2 Sheets-Sheet 2
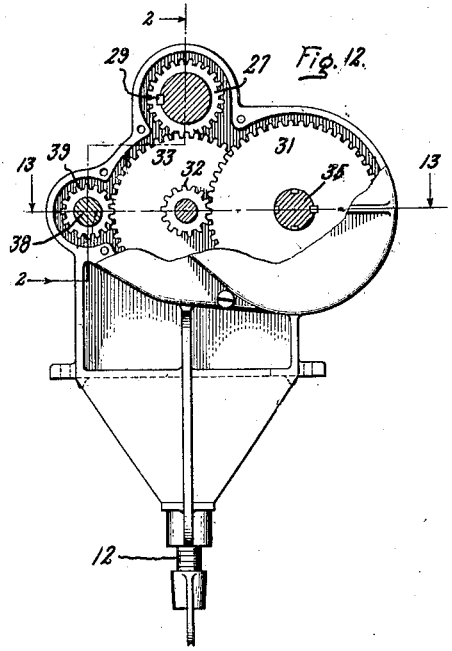
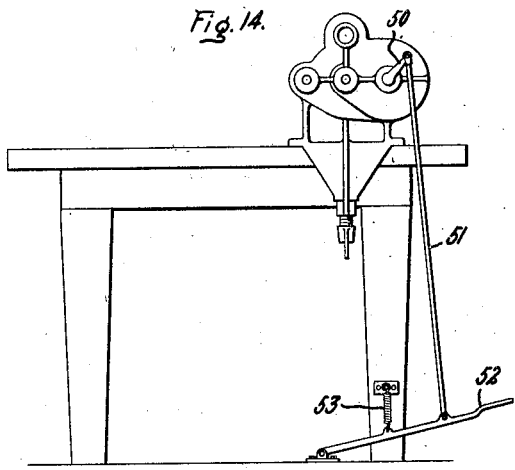
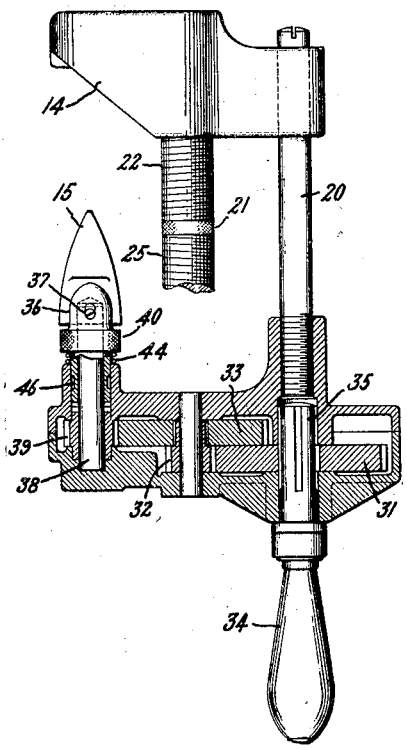
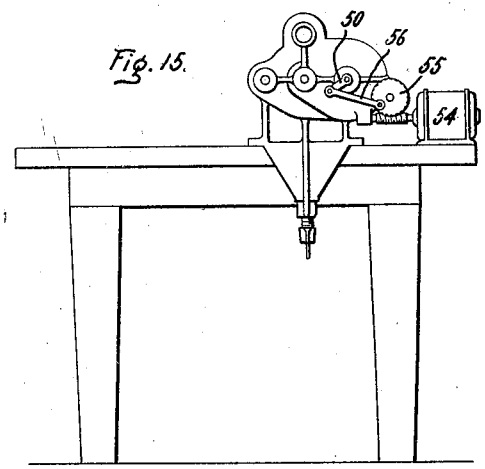
Inventor:
William P. Vanace,
by Raymond A. Miles
His Attorney Patented Dec. 3, 1929

1,737,626

UNITED STATES PATENT OFFICE

WILLIAM P. VANACE, OF SCHENECTADY, NEW YORK

OYSTER AND CLAM OPENER

Continuation of application Serial No. 227,991, filed October 22, 1927. This application filed August 8, 1928. Serial No. 298,243.

This application is a continuation of my application Serial No. 227,991, filed October 22, 1927.

The invention relates to a machine for opening bivalve shell fish, such as oysters and clams or the like.

In accordance with ordinary practice of long standing, the opening of bivalve shell food preparatory to serving is accomplished almost entirely by manual force, the shucker grasping the oyster or clam in one hand and forcefully manipulating a knife between the two half shells with the other hand so as to sever the eye, or great muscle, by which the meat is attached thereto. This is not easily accomplished due to the strong muscular effort of the bivalve to maintain the shells closed. Thus in restaurants and the like where such shell food is served, specially skilled operators are required to do the opening or shucking effectively, as the slightest slip in holding either the bivalve shell or the knife will result in severe injury to the operator's hand.

The object of the present invention is to provide an improved machine whereby the opening of bivalves such as oysters and clams, or the like, may be done rapidly and with practically no danger even by an unskilled operator.

In carrying the present invention into effect a relatively movable back stop for supporting the bivalve shell and a knife for opening the shell are mounted in opposing spaced relation so that the bivalve may be positioned against the back stop with the mouth of the shell in proper alignment to engage with the knife. A rotatable operating member arranged to be operated either by hand or by foot or by a power device such as a small electric motor is mechanically connected to press the back stop and knife together with a steady force ample to insert the knife readily between the half shells of the bivalve. After the knife has penetrated to a sufficient depth between the shells of the bivalve a clutch mechanism is automatically brought into action by engagement of a movable clutch member with the edge of the shell. This clutch mechanism is arranged to connect the shell opening knife so as to be rotated by the rotatable operating member, thus severing the eye, or great muscle, of the bivalve and rendering the subsequent removal of the meat from the shell, a simple matter, easy of accomplishment.

The accompanying drawings illustrate a preferred form of oyster and clam opening machine embodying the invention, although the form disclosed in my above mentioned application may be used advantageously. Fig. 1 is a perspective view of the machine with a bivalve in position to be opened thereby. Fig. 2 is a side view of the machine partly in section in order to show more in detail the arrangement of the operating mechanism. Fig. 3 is a detailed view of the slidable back stop for the bivalve shell. Figs. 4 and 5 are detailed views of the clutch element of the rotatable knife chuck. Figs. 6, 7 and 8 show respectively a side plan and end view of a particular form of knife suitable for opening clams. Figs. 9, 10 and 11 are similar views of a form of knife particularly suitable for opening oysters. Fig. 12 is an end view of the machine with certain parts broken away to reveal the meshing arrangement of the operating gearing. Fig. 13 is a top sectional view of the machine along the line 13—13 of Fig. 12, with certain parts omitted. Fig. 14 illustrates the machine mounted on a table and arranged for foot pedal operation, and Fig. 15 is a view of the machine arranged for motor operation.

Referring to Fig. 1, the oyster and clam opening machine in the preferred form illustrated comprises a frame 10 formed of two parts removably secured together and provided with suitable feet and a thumb screw 12 adapted for clamping the machine on the edge of a table 13 or other convenient support. The slidable back stop 14 and the relatively movable knife 15 are mounted in opposing spaced relation at one side of the frame 10 so as to permit a bivalve 16 to be held against the back stop with the mouth in position to engage with the knife when these parts are pressed together. The back stop preferably is formed with corrugated jaws 17, suitably fashioned to grip and securely hold the shell of the bivalve as indicated in Fig. 1 and is provided with a guide 18 having a cylindrical opening 19 arranged to slide on the supporting rod 20 extending from the frame 10. The corrugated jaws of the back stop 14 may be formed with a yielding or resilient facing of rubber or other suitable material in order to prevent chipping or breaking of the edges of the shell if desired. Forward and backward movement of the back stop 14 with respect to the knife 15 is obtained by means of the double threaded screw 21, one end of which is provided with right hand threads 22 to engage with the cooperating threaded opening 23 formed in back stop 14 and the other end of which is provided with left-hand threads 24 to engage with a corresponding threaded opening 25 formed in the boss 26 extending from frame 10. The detailed construction of the back stop 14 is clearly shown in Fig. 3.

Rotation of the double threaded screw 21 is obtained by means of the spur gear 27 which is mounted between bearing shoulders 28 formed on the inside of the two part frame 10. Gear 27 rides axially upon the screw 21, and as more clearly shown in Fig. 12, the gear carries a key 29 which slides in the keyway 30 formed in screw 21 and in this way transmits to the screw 21 the rotary movement imparted to gear 27 through the cooperating amplifying gears 31, 32, and 33 upon rotation of the operating handle 34. The hub 35 of handle 34 is provided with splines as shown in Fig. 13, so as to engage with cooperating keyways in the gear 31 in a number of different operating relations. Thus oscillation of the operating handle 34 through substantially a half turn produces rapid turning of the double screw 21 to move the back stop toward and away from the knife 15.

The knife 15 is detachably mounted in the slotted chuck 36 by the attaching screw 37. This permits either the clam opening type of knife illustrated in Figs. 6, 7 and 8 or the oyster opening type of knife shown in Figs. 10 and 11 or other suitable form of knife to be used in accordance with the particular work to be done. It will be observed that in each form of knife the lower side is made flat and a sloping ridge or shoulder 15ª is formed on the other side. This ridge or shoulder extends from the point of the knife with a gradually increasing height so as to act as a wedge in opening the shell of the bivalve. Referring to Figs. 2, 4, 5 and 13, it will be seen that the chuck 36 comprises the rotatable shaft 38 loosely mounted in the bore of gear 39 with one end bearing against a thrust seat in the frame 10, and carrying the knife 15 secured in a slot in the other end thereof together with the slotted clutch element 40 which loosely surrounds shaft 38 and serves to connect the knife to be rotated by the gear 39 after it has penetrated the mouth of the bivalve. The hub of gear 39 rides in suitable bearings provided in the two parts of frame 10 and this gear is in mesh with gear 33 so as to be set into rapid rotation whenever the handle 34 is operated. It will be observed that one hub of gear 39 is cut away to form shoulders 41 with which the cooperating shoulders 42 formed on the clutch element 40 may engage when this clutch element is automatically shifted axially along the shaft 38 by engagement with the shell of the bivalve therewith in the manner described more fully hereinafter.

The sides of the large slot 43 formed in the tapering end of clutch element 40 slidably engage with the flat shank of knife 15 and thus provide a strong and serviceable connection for rotating the knife. Likewise, the abutting engagement of the back of the knife with the bottom of the slot in shaft 38 which in turn bears directly against frame 10 provides a strong and serviceable support for taking up the end thrust produced when the knife is being forced between the half shells of the bivalve. The clutch element 40 is normally maintained disengaged by the spring 44. Axial movement of clutch 40 along shaft 38 by the spring 44 is limited by the screw 45 which engages with the side of the groove 46 formed in the clutch element. The periphery of the clutch element 40 is knurled as indicated in the drawing to facilitate manual adjustment of the angular position of knife 15 into proper alignment with the mouth of the bivalve as it rests against the back stop 14.

In operation, the machine is clamped on the edge of a table or other suitable support as shown in Fig. 1 and the operator places the shell of the bivalve against the back stop 14 with one hand and adjusts the knife 15 and operates the handle 34 with the other. The narrow form of the back stop readily permits the bivalve to be positioned in the corrugated jaws thereof with the mouth of the bivalve extending toward the knife 15 which as previously pointed out may be properly adjusted by rotating the knurled chuck 36 to bring the knife into substantial alignment with the mouth of the bivalve. Upon rotating the handle 34, the double threaded screw 21 is driven rapidly by means of the multiplying gearing to advance the back stop and press the bivalve against the knife with a strong and steady force. The knife does not rotate during this operation due to the fact that the clutch 40 is normally disconnected from the gear 39 by the spring 44.

In this manner the knife 15 is forced between the half shells of the bivalve, and ridge or shoulder 15ª of tapering form as shown in Figs. 6 to 11 serves to separate these parts against the muscular resistance of the bivalve. When the knife has penetrated into the mouth of the bivalve sufficiently to bring the edge of the lower half shell against the tapering end of the clutch element 40, further advancement of back stop 14 serves to shift the clutch element into engagement with the gear 39. This connects the knife 15 to be rotated quickly by the gear 39 so as to sever the eye, or great muscle, of the bivalve. Thus it will be seen that the operation of the clutch is entirely automatic and is arranged to produce a quick relative rotational movement between the knife 15 and the back stop 14 after a sufficient relative linear movement therebetween has taken place to insert the knife the proper distance into the mouth of the bivalve.

After rotation of the knife to sever the eye of the bivalve, the handle 34 is returned to its initial position thereby rotating the screw 21 in the reverse direction and separating the back stop from the knife into position for receiving the next bivalve. With the eye, or great muscle, of the bivalve severed from the shell the meat may easily be removed preparatory to serving by using the knife 15 or by means of an ordinary knife.

After the penetration of the knife 15 into the mouth of the bivalve is once started, the latter is firmly held between the back stop and the knife. Hence, the operator's hand may be entirely removed from the back stop 14 to avoid all danger of being cut by the knife. Moreover, the steady and accurately controlled force exerted upon the back stop 14 by the double threaded screw and operating mechanism therefor enables the proper positioning of the bivalve and the knife easily to be effected. The rapidity with which the shell opening operation is accomplished depends entirely upon the speed of operating the handle 34.

If desired the machine may be arranged for foot pedal operation as illustrated in Fig. 14. In this case the handle 34 is replaced by a lever arm 50 which is connected through the link 51 to the pivoted foot pedal 52. A spring 53 is provided for returning the lever arm to its initial position. This arrangement enables more rapid work to be done as both hands of the operator are available for handling the bivalves and adjusting the knife.

Likewise, the machine may be arranged for operation by power as shown in Fig. 15, the electric motor 54 serving to oscillate lever arm 50 through the worm gearing 55 and pitman arm 56. This power driving arrangement permits very rapid opening of the bivalves as the back stop is periodically moved backward and forward with respect to the knife by the electric motor.

What I claim as new and desire to secure by Letters Patent of the United States, is:

1. A bivalve shell fish opener comprising a relatively movable back stop and knife mounted in opposing relation, and operating mechanism for pressing the back stop and knife together and having an automatic clutch associated therewith for effecting relative rotation of the knife with respect to the back stop after penetration of the knife between the half shells of the bivalve.

2. A bivalve shell fish opener comprising a relatively movable back stop and knife mounted in opposing spaced relation, mechanism for effecting relative linear movement of the back stop and knife, mechanism for effecting relative rotational movement of the back stop and knife, and a common operating member for said mechanisms.

3. A bivalve shell fish opener comprising a rotatably supported knife, a movable back stop for the bivalve in opposing spaced relation with the knife, operating means for advancing the back stop to press the bivalve against the knife, and means for connecting the knife to be rotated by said operating means after a predetermined penetration of the knife between the half shells of the bivalve.

4. A bivalve shell fish opener comprising a movable back stop for holding the shell of the bivalve, a knife rotatably mounted in opposing spaced relation therewith, and operating mechanism for advancing the back stop to force the knife between the lips of the bivalve and having an automatic clutch cooperating with the shell of the bivalve for effecting relative rotation of the knife to sever the eye of the bivalve after penetration of the knife into the mouth thereof.

5. A bivalve shell fish opener comprising a frame, a knife supporting member rotatably mounted therein, a knife detachably secured to said supporting member, a movable back stop mounted on said frame in opposing alignment with said knife, an operating member rotatably mounted in said frame and mechanically connected to operate said back stop backward and forward with respect to the knife upon oscillation of the operating member, and a clutch mechanism for rotatably interconnecting said knife and said operating member under certain conditions.

6. A bivalve shell fish opener comprising a back stop against which the shell may be manually held in one hand, a knife for penetrating the mouth of the shell, mechanism for imparting relative linear and rotary movement of the knife with respect to the back stop, and means for guiding the knife into the mouth of the shell during the relative linear movement of the knife and the back stop.

7. A bivalve shell fish opener comprising a slidable back stop having corrugated jaws against which the shell may be manually held in one hand, a knife rotatably mounted in the path of the back stop, means for rotatably adjusting the knife to penetrate the mouth of the shell, a rotatable operating member mechanically connected to slide the back stop forward and back with respect to the knife upon oscillation of the operating member, and a clutch mechanism automatically operable upon a predetermined penetration of the knife into the mouth of the shell for connecting the knife to be rotated by the operating member and thereby sever the eye of the bivalve from the shell.

In witness whereof, I have hereunto set my hand this 3rd day of August 1928.

WILLIAM P. VANACE.